United States Patent Office 3,020,609
Patented Feb. 13, 1962

3,020,609
PROCESS OF FORMING A SHELL MOLD FROM A WATER, FURFURYL ALCOHOL, SAND AND CATALYST COMPOSITION
Lloyd H. Brown, Oak Park, and Jimmy W. Hill, Barrington, Ill., assignors to The Quaker Oats Company, Chicago, Ill., a corporation of New Jersey
No Drawing. Filed Mar. 29, 1956, Ser. No. 574,610
2 Claims. (Cl. 22—193)

The invention relates to polymerizable thermosetting compositions which are characterized by attaining a final cure in an extremely short period of time, and, more particularly, pertains to improved foundry sand mixes employing such compositions for use in the making of shell molds. This application is a continuation-in-part of Brown et al. application Serial No. 548,237, filed November 21, 1955.

The polymerizable thermosetting compositions which comprise part of the subject matter of this invention are furfuryl alcohol-catalyst mixtures. As disclosed in the copending Brown et al. application, furfuryl alcohol resins are becoming of increasingly greater commercial significance, and one of their newest applications is in the comparatively new process commonly known in the art as shell molding.

Shell molding comprises a process in which castings are made in molds which are shells of sand, usually ranging in thickness from about one-eighth to three-eighths of an inch. The grains of said which make up these molds are bonded together with thermosetting resins in an amount comprising between about 2.5 to 10 percent by weight of the said. In the usual shell mold formation, a foundry sand mix of sand and a binder is disposed on the surface of a heated pattern until the coating on the sand grains becomes plastic and tacky, whereby a coherent shell of desired sand thickness is formed.

The sand and binder mixture may be either dumped on the pattern surface in a process which utilizes a pattern disposed over a sand box both of which are rotatable; this method is called the dump or inversion process. The sand and binder mixture may be also applied as a turbulent mass in air directed to the heated surface of the pattern by a suitable means; this process is commonly known as the blow process. After the resulting shell of desired thickness has been formed on a pattern surface, it may be cured in an oven for approximately two minutes at an elevated curing temperature to form the final shell product.

It is desirable in the blow process that the thermosetting material mixed with the sand and which coats the individual grains thereof produces a sand mix having what is known in the molding art as green strength; that is, the sand grains should cohere compactly when placed adjacent a pattern surface. If the foundry sand mix has the desired green strength, the mix adhering to the pattern and disposed adjacent thereto will not crumble under its own weight when disposed along a vertical portion of the pattern surface, during the initial stage of the shell mold formation.

It is also desired that a foundry sand mix intended for use in shell molding be capable of standing for prolonged periods of time at room temperature without becoming tacky. That is, it is desired that the polymerizable, rapidly thermosetting composition disposed on the surface of the individual sand grains does not resinify to form viscous liquids at room temperature to such an extent so as to destroy the desired green strength of the sand mix. It is thus preferable that a sand mix be capable of standing overnight, that is for a period of approximately sixteen hours without becoming tacky, and still possess the desired green strength following this period when it is utilized. The period of time in which a foundry sand mix is able to remain in its prepared condition while possessing the desired green strength is known as mix life.

Foundry sand mixes utilizing furfuryl alcohol polymers have heretofore been prepared. However, the presence of the monomeric form of the furfuryl alcohol was deemed undesirable because of its ready evaporation at elevated curing temperatures. This tendency to readily evaporate gave rise to excessive losses of potential binder and a resulting decrease in strength. Consequently, in these prior art sand mixes, special processing steps were taken to form furfuryl alcohol polymers of low viscosity from which the monomeric form of the alcohol has been removed. Such monomer-free polymers evaporated less readily at elevated curing temperatures.

The utilization of such furfuryl alcohol polymers of low viscosity in a foundry sand mix in some cases involved its coreaction with other resins such as phenolics. The monomeric form of the furfuryl alcohol was also undesirable in these prior art mixes, since it tended to dissolve the phenolics producing a tacky mix and thereby destroyed the desired green strength.

It is an object of this invention to provide a rapid-curing foundry sand mix employing the monomeric form of furfuryl alcohol which is adapted to produce shell molds of high strength without utilizing other resinous strengthening agents.

It is a further object of this invention to provide a shell mold formed from sand and monomeric furfuryl alcohol which is cheaper to produce because of the elimination of the prior art steps of polymer formation and monomer removal, which mold also has strength equivalent to the prior art shell molds.

It is a still further object of this invention to provide foundry sand mixes which cure in a fraction of the time heretofore believed necessary in the formation of shell molds.

It is an object of this invention to provide quick-curing sand mixes which also possess a long usable mix life.

It is another object of this invention to provide rapid-curing sand mixes, stable in green strength, which utilize urea which is substituted for a portion of the furfuryl alcohol. These sand mixes also provide shell molds of high strength equivalent to those of the prior art.

The above and other objects of this invention will become more apparent upon proceeding with a reading of the following description and the appended claims.

In accordance with one embodiment of this invention, particles of foundry sand are uniformly coated with an acid-reacting catalyst, such as ferric chloride, and urea. A small quantity of water is added to facilitate mixing and also to enable acid formation to take place. The mixing is continued until the sand grains have the urea and heavy metal chloride evenly distributed thereover. Furfuryl alcohol is then added and a second homogeneous mixture is formed in the manner just described.

All mixing, commonly referred to as mulling, is effected at room temperature and should not be carried out for excessive periods of time or at excessive rates of speed, so as to avoid the generation of excess heat which would cause polymerization of the readily polymerizable furfuryl alcohol. The resulting foundry sand mix is capable of standing overnight, that is sixteen hours, while retaining desired green strength. When the resulting foundry sand mix is disposed on a pattern, heated to a temperature of approximately 500° F., a shell of approximately one-quarter of an inch in thickness may be formed which cures to a final sand-resin product of high strength in approximately one-half minute.

Such rapid-curing, polymerizable, thermosetting compositions of stable green strength have heretofore been unknown in the art. It is thus seen that thermosetting compositions of furfuryl alcohol in admixture with foundry sand have been provided which are of high strength, requiring no strengthening agent addition, and which cure with a rapidity heretofore impossible. The monomeric furfuryl alcohol-sand mixes obviously provide savings in processing time and curing time which become increasingly greater as the rate of production increases. The savings in industrial fields such as the automotive industry, where hundreds of thousands of castings are made weekly, are large.

The furfuryl alcohol resinification products of this invention which bind the sand grains together are formed by the concomitant intermolecular dehydration and resinification known to be characteristic of this alcohol. Among the catalysts which are known to catalyze the dehydration and resinification are mineral acids, dibasic acid anhydrides, carboxylic acids, sulfonic acids, and various acidic salts. In general, any acid-reacting substance capable of liberating an acid having a dissociation constant of at least $3 \times 10^{-2}$ when dissolved in water will work satisfactorily.

The resinifiable components of the sand mix formulation of the above embodiment do not readily polymerize at room temperature, possessing good mix life, but are highly reactive at elevated temperatures. Those catalysts utilized in the provided sand mixes which are stable at room temperature, whereby polymerization of the furfuryl alcohol is maintained at such a low level that the green strength of the mix is preserved for extended periods of time, are obviously preferable where long mix life is desired. At the elevated curing temperature, all of the well known acid-reacting catalysts having the prescribed degree of dissociation function to trigger the previously described resinification of the monomeric furfuryl alcohol. The polymerization of furfuryl alcohol is highly exothermic and may be catalyzed by heat alone; however, in the presence of an acid-reacting catalyst capable of liberating an acid having a dissociation constant of at least $3 \times 10^{-2}$ when dissolved in water, the polymerization action is instantaneously triggered at the elevated pattern surface temperatures and a complete cure is effected in extremely short time intervals. Because of the rapid polymerization effected, evaporation losses of monomeric furfuryl alcohol are negligible. A concomitant of the rapid polymerization is the generation of heat resulting from the exothermic nature of this reaction; this heat assists in effecting curing of the shell mold.

The following examples are illustrative of foundry sand mixes which cure in exceedingly short periods of time.

Example 1

One hundred parts by weight of sand are intimately mixed with 1 part by weight of zinc chloride and 0.25 part by weight of water until a homogeneous mixture is formed. Five parts by weight of furfuryl alcohol are added thereto and mixed therewith until a second homogeneous mixture is formed. Upon disposing the resulting sand mix on the surface of a pattern having a temperature of approximately 500° F., a one-quarter inch thick shell mold results which completely cured in 35 seconds and which is of high strength.

It is apparent from Example 1 that monomeric furfuryl alcohol by itself and in the absence of any strength modifiers is capable of forming a cured shell of high strength in the amazingly short cure time of 35 seconds. It is obvious that subsequent heating in an oven is not essential since the entire curing of the shell mold is effected on the heated pattern surface. It is also apparent that the monomeric furfuryl alcohol need not be processed as previously required so as to form monomer-free, low-viscosity resins prior to utilization in the foundry sand mixes.

Example 2

One hundred parts by weight of foundry sand are mixed with 1 part by weight of ferric chloride, 0.25 part by weight of water, plus 0.5 part by weight of urea. Mixing is carried out until a homogeneous mix results. Five parts by weight of monomeric furfuryl alcohol are then added and a second homogeneous mixture is formed.

Upon application of this foundry sand mix to a pattern surface heated to a temperature of approximately 500° F., a cured shell of high strength is formed in 20 seconds. The mix life of the foundry sand composition of this example is six hours. It will be noted that, although urea was added in the amount of 10 percent by weight of the furfuryl alcohol, the resulting resin product was of good strength. The urea stabilizes the acid-reacting catalyst at room temperature so as to prolong the mix life of the foundry sand mix. In addition to functioning as a catalyst stabilizer, it is believed that the urea in the course of the final cure reacts with the furfuryl alcohol in a manner which is not completely known. When used in the above amount, the urea in no way deleteriously affects the final strength of the shell mold.

Example 3

One hundred parts by weight of foundry sand are intimately mixed with 1 part by weight of ferric chloride, 0.1 part by weight of water and 5 parts by weight of monomeric furfuryl alcohol, in accordance with the process steps disclosed in the previous two examples. Upon applying the resulting foundry sand mix to a heated pattern having a surface temperature of 500° F., a sand-resin product, or shell mold, of high strength results in 20 seconds. However, the mix life of this foundry sand mix is less than one hour. It is apparent from this example that the ferric chloride catalyst was much more reactive at room temperature since the stabilizing effect of the urea utilized in Example 2 was not present. The foundry sand mix of Example 3 may be used to advantage where a rapid cure time is desired and where a sand mix having a short mix life will present no problem.

Example 4

One hundred parts by weight of foundry sand are mixed with 1 part by weight of oxalic acid and 5 parts by weight of monomeric furfuryl alcohol in accordance with the process of the previous examples. The resulting sand mix when applied to a pattern surface heated to 500° F. cures to a strong sand-resin product. The mix life of the mix of Example 4 was two hours. The cure time for the shell mold formed was 40 seconds.

The activity of the various acid-reacting catalysts capable of being utilized in the provided process may be retarded at room temperature by means such as admixture with a basic substance as disclosed in the following example.

Example 5

The ingredients of Example 3 are mixed in accordance with the procedure disclosed therein with the exception of 0.5 part by weight of ammonium hydroxide being added to the ferric chloride catalyst. The cure time of the resulting foundry mix is 40 seconds which is twice as long as that of the foundry sand mix of Example 2. However, the mix life of the foundry sand mix of Example 5 is twice as long as that of the mix of Example 3.

The inventive concepts herein disclosed are not limited to use with monomeric furfuryl alcohol. Monomer-free, low viscosity furfuryl alcohol resins may also be incorporated in foundry sand mixes which possess a long mix life in addition to curing rapidly into high-strength shell molds. Such a sand mix is disclosed in the following example:

Example 6

Three hundred parts by weight of foundry sand are mixed with 2 parts by weight of ferrous chloride, 0.5 part by weight of urea, 1 part by weight of water and 15 parts by weight of a monomer-free, low viscosity furfuryl alcohol resin product in accordance with the process steps of the previous examples. The life of the resulting mix was sixteen hours and cured in thirty-five seconds, when applied to a pattern surface heated to 500° F., into a shell mold of good strength.

It is seen from the foregoing examples that furfuryl alcohol and low viscosity polymers thereof rapidly polymerize at elevated temperatures to form resin-sand products of high strength having tensile strengths of over 300 pounds per square inch. This quick-curing property is extremely valuable in the formation of shell molds. It should be remembered, however, in this latter connection, that the acid-reacting catalysts which may be utilized in the process of forming a shell mold with furfuryl alcohol should be present in such concentration not only to satisfy the acid demand of the basic components of the foundry sand but, in addition, should provide excess acid values which are sufficient to polymerize the monomeric furfuryl alcohol. The quantity of catalyst to effect a desired cure with a specific foundry sand may be readily determined by one skilled in the art. The previous examples are indicative of the quantities to be employed in effecting various cure times.

It has also been made apparent from the foregoing examples that the stronger the acid catalyst, the shorter the mix life, that is, the more rapid the polymerization which will be effected at room temperature; and, obviously, the weaker or more latent the catalyst the greater the mix life at room temperature. It has also been seen from the above examples that urea may be utilized with the monomeric furfuryl alcohol and catalyst to not only retard the acid-reacting catalyst at room temperature but to also polymerize with the monomeric furfuryl alcohol in the course of effecting a final cure at elevated temperatures. Since urea is at the present time lower in price than the furfuryl alcohol, the advantages to be obtained from such a substitution are apparent.

Many modifications in the process of forming the sand mixes of the previous examples may be made which will still remain within the ambit of the inventive concepts herein disclosed. For example, although the curing temperature specified in the previous examples, that is, the temperature to which the pattern surface was heated, was 500° F., any curing temperature within the range of approximately 400° to 600° F. will be suitable; the range of 500° to 600° F. is preferred. It should also be noted that although urea may be incorporated in these various sand mixes without deleteriously affecting the strength of the resulting shell mold, the urea should not exceed approximately 80 percent of the weight of the monomeric furfuryl alcohol in any one mix.

Still further, it will be understood from Example 6 that the provided process will effect quick cure times in foundry sand mixes employing monomer-free, low viscosity furfuryl alcohol polymers, and the teachings of this invention are not to be restricted merely to monomeric furfuryl alcohol. Low viscosity furfuryl alcohol polymers in admixture with monomeric furfuryl alcohol also effect compositions which are sufficiently fluid at room temperature to provide good green strength in a foundry sand mix and will readily polymerize at the elevated cure temperatures herein disclosed to form shell molds of high strength. Monomeric furfuryl alcohol, monomer-free furfuryl alcohol and mixtures of the two are all suitable for purposes of this invention.

As previously mentioned, the catalysts to be employed are the acid-reacting catalysts which produce an acid having a dissociation constant of at least $3 \times 10^{-2}$ when dissolved in water. With regard to the concentration of the catalysts, a sufficiency should be present which, in addition to satisfying the alkaline values of the sand will also substantially instantaneously trigger the exothermic polymerization reaction which takes place at the elevated curing temperature. The latter polymerization is effected so rapidly that the deleterious effects of the volatilization of the monomeric furfuryl alcohol, or low viscosity furfuryl alcohol resin are minimized.

In view of the many modifications which may be made in the provided sand mixes and the process of forming the same, we wish our inventive concepts herein disclosed to be limited only by the scope of the appended claims.

We claim:

1. A process for forming a shell mold from a water, furfuryl alcohol, sand and acid-reacting catalyst composition, said process comprising the steps of mixing said water, sand and acid-reacting catalyst until a first substantially homogeneous mixture is formed, adding between about 2.5 and 10% of furfuryl alcohol based on the weight of said sand until a second substantially homogeneous mixture is formed having good green strength, and applying said second homogeneous mixture within approximately 16 hours after formation thereof to a pattern having a temperature of between about 400°–600° F., whereby said furfuryl alcohol is resinified in a single stage, said acid reacting catalyst being selected from the group consisting of ferric chloride, zinc chloride, ferrous chloride and oxalic acid and present in a sufficient quantity to neutralize the alkaline values of said sand and trigger polymerization of said furfuryl alcohol at said temperature of between about 400°–600° F., said water being present in a quantity sufficient to facilitate mixing and enable acid formation to take place.

2. Process of claim 1 in which urea in an amount not exceeding about 80% by weight of said furfuryl alcohol is added in the formation of said first homogeneous mixture.

References Cited in the file of this patent

UNITED STATES PATENTS

| | | |
|---|---|---|
| 2,437,955 | Hersh | Mar. 16, 1948 |
| 2,471,600 | Adams et al. | May 31, 1949 |
| 2,521,614 | Valyi | Sept. 5, 1950 |
| 2,653,920 | Harford | Sept. 29, 1953 |
| 2,683,296 | Drumm | July 13, 1954 |
| 2,768,408 | Strigle et al. | Oct. 30, 1956 |

FOREIGN PATENTS

| | | |
|---|---|---|
| 159,115 | Australia | June 11, 1953 |
| 200,453 | Australia | Feb. 17, 1955 |

OTHER REFERENCES

"Technology of Adhesives," Del Monte, Reinhold Publishing Co., New York City, 1947, pages 100–105.